US012784200B2

(12) United States Patent
Ogasawara et al.

(10) Patent No.: US 12,784,200 B2
(45) Date of Patent: Nov. 3, 2026

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventors: Aya Ogasawara, Tokyo (JP); Mizuki Takei, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 281 days.

(21) Appl. No.: 18/522,285

(22) Filed: Nov. 29, 2023

(65) Prior Publication Data

US 2024/0095918 A1 Mar. 21, 2024

Related U.S. Application Data

(63) Continuation of application No. PCT/JP2022/018959, filed on Apr. 26, 2022.

(30) Foreign Application Priority Data

Jun. 25, 2021 (JP) ................................ 2021-105655

(51) Int. Cl.
*G06T 7/11* (2017.01)
*G06T 7/00* (2017.01)
*G06V 10/44* (2022.01)

(52) U.S. Cl.
CPC .............. *G06T 7/0012* (2013.01); *G06T 7/11* (2017.01); *G06V 10/44* (2022.01); *G06T 2207/10072* (2013.01)

(58) Field of Classification Search
CPC .................... G06T 7/0012; G06T 7/11; G06T 2207/10072; G06V 10/44; G06V 10/82; A61B 5/055; A61B 6/03
See application file for complete search history.

(56) References Cited

U.S. PATENT DOCUMENTS

2011/0054295 A1 3/2011 Masumoto et al.
2011/0105881 A1 5/2011 Kakimoto et al.
(Continued)

FOREIGN PATENT DOCUMENTS

JP 2005237441 9/2005
JP 2005237441 A * 9/2005
(Continued)

OTHER PUBLICATIONS

Kao-Lang Liu et al., "Deep learning to distinguish pancreatic cancer tissue from non-cancerous pancreatic tissue: a retrospective study with cross-racial external validation", The Lancet Digital Health, May 6, 2020, pp. 303-313.
(Continued)

*Primary Examiner* — Syed Haider
(74) *Attorney, Agent, or Firm* — JCIPRNET

(57) ABSTRACT

A processor is configured to set a first region including an entire target organ for a medical image, set a plurality of small regions including the target organ in the first region, derive a first evaluation value indicating presence or absence of an abnormality in the first region, derive a second evaluation value indicating the presence or absence of the abnormality in each of the plurality of small regions, and derive a third evaluation value indicating the presence or absence of the abnormality in the medical image from the first evaluation value and the second evaluation value.

11 Claims, 12 Drawing Sheets

(56) References Cited

U.S. PATENT DOCUMENTS

| | | | | |
|---|---|---|---|---|
| 2011/0135172 | A1 | 6/2011 | Kitamura | |
| 2014/0194725 | A1 | 7/2014 | Kakimoto et al. | |
| 2014/0341471 | A1* | 11/2014 | Ono | A61B 5/0042 382/173 |
| 2015/0366500 | A1 | 12/2015 | Aoyagi et al. | |
| 2016/0300351 | A1* | 10/2016 | Gazit | A61B 6/032 |
| 2018/0099008 | A1* | 4/2018 | Kang | A61K 9/0019 |
| 2018/0144467 | A1* | 5/2018 | Sofka | G06T 7/0012 |
| 2018/0263585 | A1* | 9/2018 | Weiss | A61B 6/50 |
| 2021/0303935 | A1* | 9/2021 | Ma | G06V 10/82 |
| 2022/0180514 | A1* | 6/2022 | Vlasimsky | A61B 6/5217 |

FOREIGN PATENT DOCUMENTS

| | | |
|---|---|---|
| JP | 2010012176 | 1/2010 |
| JP | 2010200925 | 9/2010 |
| JP | 2010220732 | 10/2010 |
| JP | 2011067594 | 4/2011 |
| JP | 2016007270 | 1/2016 |
| JP | 2019149093 | 9/2019 |

OTHER PUBLICATIONS

"Written Opinion of the International Searching Authority (Form PCT/ISA/237) of PCT/JP2022/018959," mailed on Jul. 12, 2022, with English translation thereof, pp. 1-7.

"International Search Report (Form PCT/ISA/210) of PCT/JP2022/018959," mailed on Jul. 12, 2022, with English translation thereof, pp. 1-5.

"Notice of Reasons for Refusal of Japan Counterpart Application", issued on Sep. 9, 2025, with English translation thereof, pp. 1-6.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This application is a continuation of International Application No. PCT/JP2022/018959, filed on Apr. 26, 2022, which claims priority from Japanese Patent Application No. 2021-105655, filed on Jun. 25, 2021. The entire disclosure of each of the above applications is incorporated herein by reference.

BACKGROUND

Technical Field

The present disclosure relates to an image processing apparatus, an image processing method, and an image processing program.

Related Art

In recent years, with the progress of medical devices, such as a computed tomography (CT) apparatus and a magnetic resonance imaging (MRI) apparatus, it is possible to make an image diagnosis by using a medical image having a higher quality and a higher resolution. In addition, computer-aided diagnosis (CAD), in which the presence probability, positional information, and the like of a lesion are derived by analyzing the medical image and presented to a doctor, such as an image interpretation doctor, is put into practical use.

However, in the medical image to be interpreted, even in an image of a patient having the lesion, an abnormal region indicating the lesion may be shown very minimally. For such cases, a method has been proposed to divide the target organ into small regions and to make a diagnosis using the evaluation results of the small regions in order to consider local information such as property and shape changes localized around the lesion site. For example, "Liu, Kao-Lang, et al. "Deep learning to distinguish pancreatic cancer tissue from non-cancerous pancreatic tissue: a retrospective study with cross-racial external validation." The Lancet Digital Health 2.6 (2020): e303-e313" proposes a method of determining normal or abnormal of the entire target organ by dividing the target organ into small regions, calculating an evaluation value representing the presence or absence of lesions in each small region, and integrating the evaluation values. In addition, in JP2016-007270A, a method of dividing a lesion detected by CAD into a plurality of small regions, extracting the feature amount of each small region, and integrating the feature amount of each small region to extract the feature amount of the lesion has been proposed.

However, changes in shape and properties of the target organ indicating the lesion are not always localized in a small region. Therefore, it is not possible to accurately determine an abnormality of the target organ only by integrating the evaluation values of the small regions or the feature amount with methods described in the literature of Liu et al and JP2016-007270A.

SUMMARY OF THE INVENTION

The present disclosure has been made in view of the above circumstances, and an object of the present disclosure is to enable accurate evaluation of an abnormality of a target organ.

The present disclosure relates to an image processing apparatus comprising at least one processor, in which the processor is configured to:

set a first region including an entire target organ for a medical image;

set a plurality of small regions including the target organ in the first region;

derive a first evaluation value indicating presence or absence of an abnormality in the first region;

derive a second evaluation value indicating the presence or absence of the abnormality in each of the plurality of small regions; and derive a third evaluation value indicating the presence or absence of the abnormality in the medical image from the first evaluation value and the second evaluation value.

It should be noted that, in the image processing apparatus according to the present disclosure, the first evaluation value may include at least one of a presence probability of the abnormality, a position of the abnormality, a shape feature of the abnormality, or a property feature of the abnormality in the first region, the second evaluation value may include at least one of a presence probability of the abnormality, a position of the abnormality, a shape feature of the abnormality, or a property feature of the abnormality in each of the small regions, and the third evaluation value may include at least one of a presence probability of the abnormality, a position of the abnormality, a shape feature of the abnormality, or a property feature of the abnormality in the medical image.

In addition, in the image processing apparatus according to the present disclosure, the processor may be configured to set the plurality of small regions by dividing the first region based on an anatomical structure.

In addition, in the image processing apparatus according to the present disclosure, the processor may be configured to set the plurality of small regions based on an indirect finding regarding the target organ.

In addition, in the image processing apparatus according to the present disclosure, the indirect finding may include at least one of atrophy, swelling, stenosis, or dilation that occurs in the target organ.

In addition, in the image processing apparatus according to the present disclosure, the processor may be configured to set an axis passing through the target organ, and set the small region in the target organ along the axis.

In addition, in the image processing apparatus according to the present disclosure, the processor may be configured to display an evaluation result based on at least one of the first evaluation value, the second evaluation value, or the third evaluation value on a display.

In addition, in the image processing apparatus according to the present disclosure, the medical image may be a tomographic image of an abdomen including a pancreas, and the target organ is a pancreas.

In addition, in the image processing apparatus according to the present disclosure, the processor may be configured to set the small region by dividing the pancreas into a head portion, a body portion, and a caudal portion.

The present disclosure relates to an image processing method comprising:

setting a first region including an entire target organ for a medical image;

setting a plurality of small regions including the target organ in the first region;

deriving a first evaluation value indicating presence or absence of an abnormality in the first region;

deriving a second evaluation value indicating the presence or absence of the abnormality in each of the plurality of small regions; and deriving a third evaluation value indicating the presence or absence of the abnormality in the medical image from the first evaluation value and the second evaluation value.

It should be noted that a program for causing a computer to execute the image processing method according to the present disclosure may be provided.

According to the present disclosure, it is possible to accurately evaluate the abnormality of the target organ.

DETAILED DESCRIPTION

Figure 1:
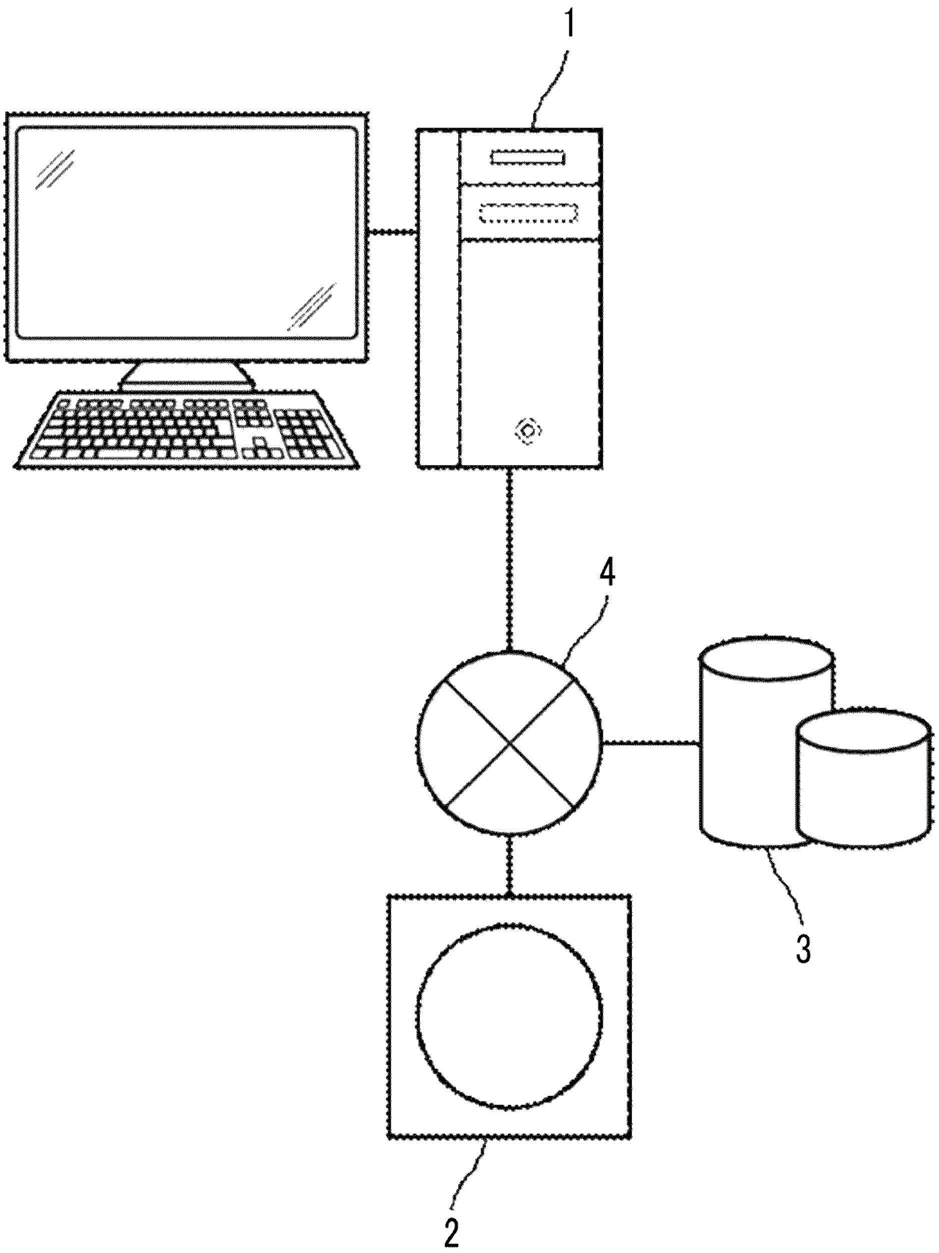
FIG. 1 is a diagram illustrating a schematic configuration of a diagnosis support system to which an image processing apparatus according to an embodiment of the present disclosure is applied.

In the following, embodiments of the present disclosure will be explained with reference to the drawings. First, a configuration of a medical information system to which an image processing apparatus according to the present embodiment is applied will be described. FIG. 1 is a diagram illustrating a schematic configuration of the medical information system. In the medical information system illustrated in FIG. 1, a computer 1 including the image processing apparatus according to the present embodiment, an imaging apparatus 2, and an image storage server 3 are connected via a network 4 in a communicable state.

The computer 1 includes the image processing apparatus according to the present embodiment, and an image processing program according to the present embodiment is installed in the computer 1. The computer 1 may be a workstation or a personal computer directly operated by a doctor who makes a diagnosis, or may be a server computer connected to the workstation or the personal computer via the network. The image processing program is stored in a storage device of the server computer connected to the network or in a network storage to be accessible from the outside, and is downloaded and installed in the computer 1 used by the doctor, in response to a request. Alternatively, the image processing program is distributed in a state of being recorded on a recording medium, such as a digital versatile disc (DVD) or a compact disc read only memory (CD-ROM), and is installed in the computer 1 from the recording medium.

The imaging apparatus 2 is an apparatus that images a diagnosis target part of a subject to generate a three-dimensional image showing the part and is, specifically, a CT apparatus, an MRI apparatus, a positron emission tomography (PET) apparatus, and the like. The three-dimensional image consisting of a plurality of tomographic images generated by the imaging apparatus 2 is transmitted to and stored in the image storage server 3. It should be noted that, in the present embodiment, the imaging apparatus 2 is a CT apparatus, and a CT image of a thoracoabdominal portion of the subject is generated as the three-dimensional image. It should be noted that the acquired CT image may be a contrast CT image or a non-contrast CT image.

The image storage server 3 is a computer that stores and manages various types of data, and comprises a large-capacity external storage device and database management software. The image storage server 3 communicates with another device via the wired or wireless network 4, and transmits and receives image data and the like to and from the other device. Specifically, the image storage server 3 acquires various types of data including the image data of the three-dimensional image generated by the imaging apparatus 2 via the network, and stores and manages the various types of data in the recording medium, such as the large-capacity external storage device. It should be noted that the storage format of the image data and the communication between the devices via the network 4 are based on a protocol, such as digital imaging and communication in medicine (DICOM).

Figure 2:
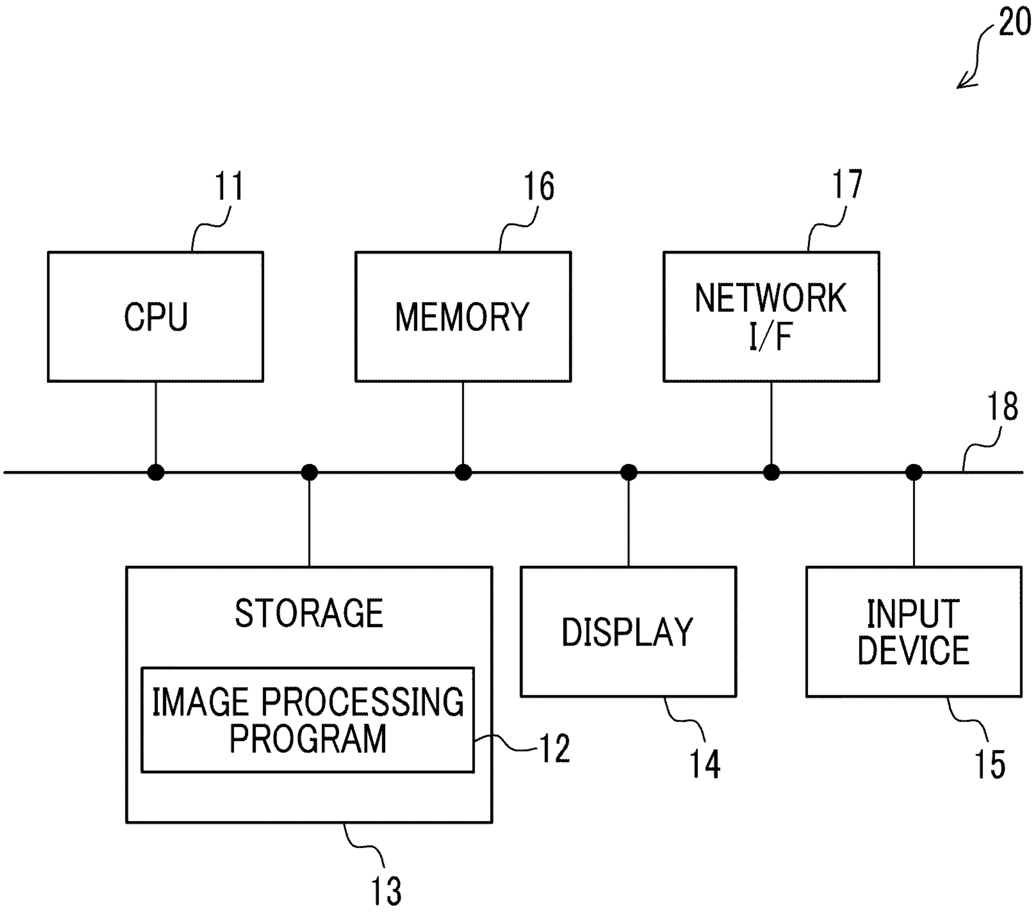
FIG. 2 is a diagram illustrating a hardware configuration of the image processing apparatus according to the present embodiment.

Next, the image processing apparatus according to the present embodiment will be described. FIG. 2 is a diagram illustrating a hardware configuration of the image processing apparatus according to the present embodiment. As illustrated in FIG. 2, the image processing apparatus 20 includes a central processing unit (CPU) 11, a non-volatile storage 13, and a memory 16 as a transitory storage region. In addition, the image processing apparatus 20 includes a display 14, such as a liquid crystal display, an input device 15, such as a keyboard and a mouse, and a network interface (I/F) 17 connected to the network 4. The CPU 11, the storage 13, the display 14, the input device 15, the memory 16, and the network I/F 17 are connected to a bus 18. It should be noted that the CPU 11 is an example of a processor according to the present disclosure.

The storage 13 is realized by a hard disk drive (HDD), a solid state drive (SSD), a flash memory, and the like. An image processing program 12 is stored in the storage 13 as a storage medium. The CPU 11 reads out the image processing program 12 from the storage 13, develops the image processing program 12 in the memory 16, and executes the developed image processing program 12.

Figure 3:
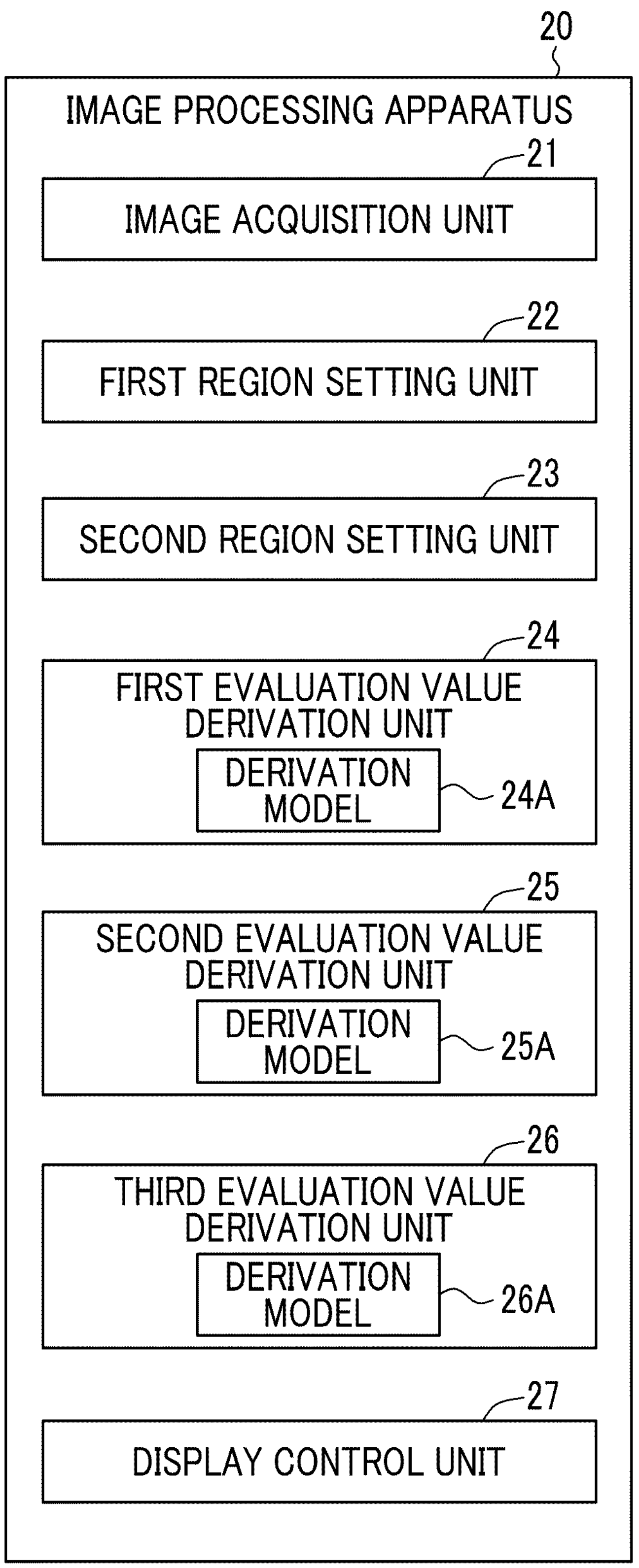
FIG. 3 is a functional configuration diagram of the image processing apparatus according to the present embodiment.

Hereinafter, a functional configuration of the image processing apparatus according to the present embodiment will be described. FIG. 3 is a diagram illustrating the functional configuration of the image processing apparatus according to the present embodiment. As illustrated in FIG. 3, the image processing apparatus 20 comprises an image acquisition unit 21, a first region setting unit 22, a second region setting unit 23, a first evaluation value derivation unit 24, a second evaluation value derivation unit 25, a third evaluation value derivation unit 26, and a display control unit 27. By executing the image processing program 12 by the CPU 11, the CPU 11 functions as the image acquisition unit 21, the first region setting unit 22, the second region setting unit 23, the first evaluation value derivation unit 24, the second evaluation value derivation unit 25, the third evaluation value derivation unit 26, and the display control unit 27.

The image acquisition unit 21 acquires a target image G0 that is a processing target from the image storage server 3 in response to an instruction from the input device 15 by an operator. In the present embodiment, the target image G0 is the CT image including the plurality of tomographic images including the thoracoabdominal portion of the human body as described above. The target image G0 is an example of a medical image according to the present disclosure.

Figure 4:
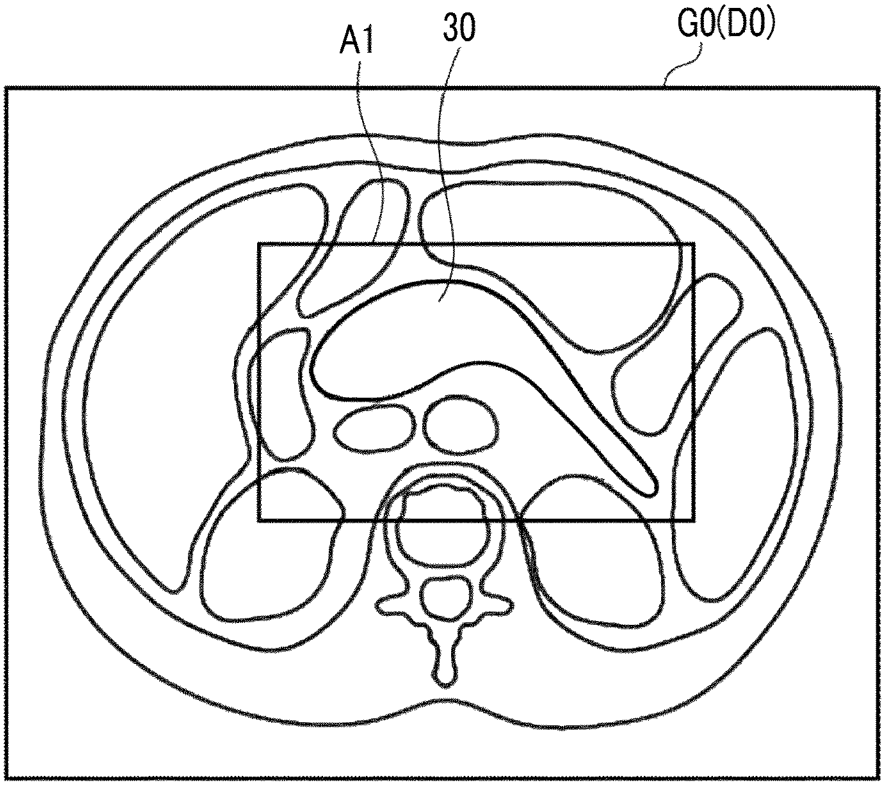
FIG. 4 is a diagram illustrating a setting of a first region.
Figure 5:
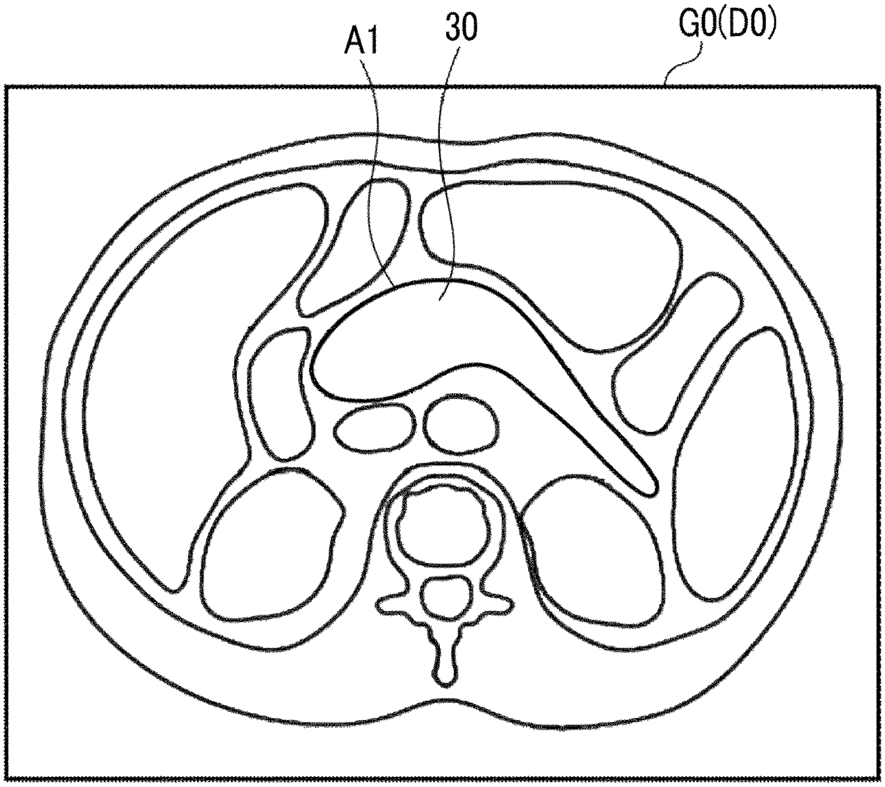
FIG. 5 is a diagram illustrating a setting of the first region.

The first region setting unit 22 sets a first region including the entire target organ for the target image G0. In the present embodiment, the target organ is a pancreas. Therefore, the first region setting unit 22 sets the first region including the entire pancreas for the target image G0. Specifically, the first region setting unit 22 may set the entire region of the target image G0 as the first region. In addition, the first region setting unit 22 may set a region in which the subject is present in the target image G0 to the first region. In addition, as illustrated in FIG. 4, a first region A1 may be set to include the pancreas 30 and the periphery region of the pancreas 30. In addition, as illustrated in FIG. 5, only the region of the pancreas 30 may be set to the first region A1. It should be noted that settings of the first region A1 for one tomographic image D0 included in the target image G0 are illustrated in FIG. 4 and FIG. 5.

It should be noted that, for specifying the region of the pancreas in the target image G0, the first region setting unit 22 extracts the pancreas, which is the target organ, from the target image G0. To this end, the first region setting unit 22 includes a semantic segmentation model (hereinafter, referred to as a SS model) subjected to machine learning to extract the pancreas from the target image G0. As is well known, the SS model is a machine learning model that outputs an output image in which a label representing an extraction object (class) is assigned to each pixel of the input image. In the present embodiment, the input image is a tomographic image constituting the target image G0, the extraction object is the pancreas, and the output image is an image in which a region of the pancreas is labeled. The SS model is constructed by a convolutional neural network (CNN), such as residual networks (ResNet) or U-shaped networks (U-Net).

The extraction of the target organ is not limited to the extraction using the SS model. Any method of extracting the target organ from the target image G0, such as template matching or threshold value processing for a CT value, can be applied.

Figure 6:
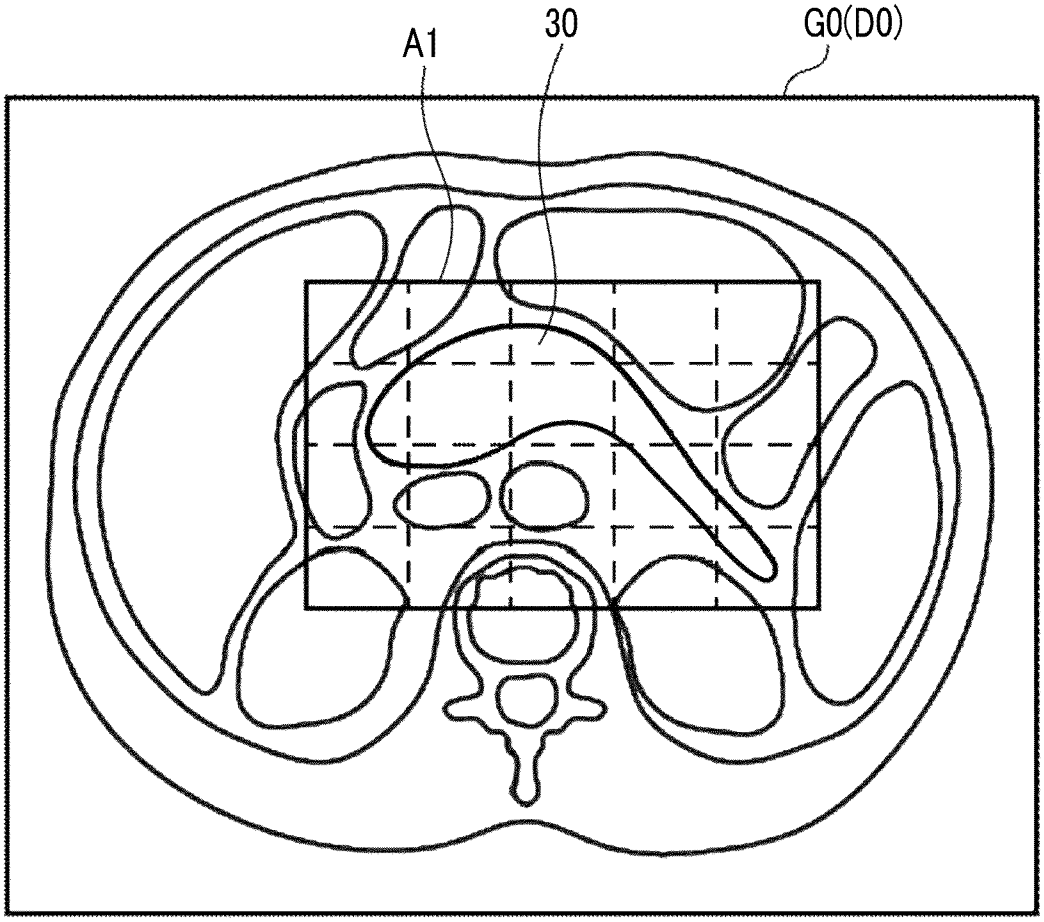
FIG. 6 is a diagram illustrating a setting of the small region.

The second region setting unit 23 can set a plurality of small regions including the target organ in the first region A1 including the entire target organ (that is, the pancreas) set in the target image G0 by the first region setting unit 22. For example, in a case in which the first region A1 is the entire region of the target image G0 or the region in which the subject included in the target image G0 is present, the second region setting unit 23 sets individual organs such as pancreas, liver, spleen, and kidney included in the first region A1 to a small region. In addition, in a case in which the first region A1 is a region including the pancreas 30 as illustrated in FIG. 4, the second region setting unit 23 may set individual organs such as pancreas, liver, spleen, and kidney included in the first region A1 to a small region. In addition, as illustrated in FIG. 6, a small region may be set by dividing the first region A1 into tiles. In addition, even in a case in which the first region A1 is the entire region of the target image G0 or the subject region included in the target image G0, the first region A1 may be divided into tiles.

In addition, as illustrated in FIG. 5, in a case in which the first region A1 is the region of the pancreas 30, the second region setting unit 23 may set a plurality of small regions in the target organ (that is, the pancreas). For example, the second region setting unit 23 may divide the region of the pancreas, which is the first region A1, into the head portion, the body portion, and the caudal portion to set each of the head portion, the body portion, and the caudal portion as the small region.

Figure 7:
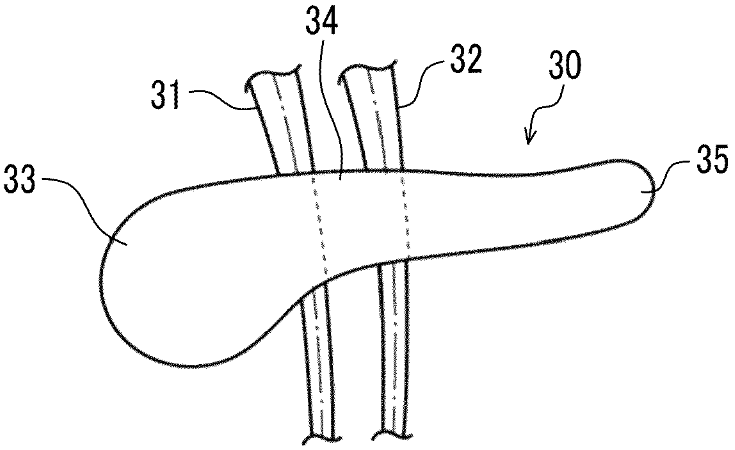
FIG. 7 is a diagram illustrating a setting of the small region.

FIG. 7 is a diagram illustrating the division of the pancreas into the head portion, the body portion, and the caudal portion. It should be noted that FIG. 7 is a diagram of the pancreas as viewed from the front of the human body. In the following description, the terms "up", "down", "left", and "right" are based on a case in which the human body in a standing posture is viewed in the front. As illustrated in FIG. 7, in a case in which the human body is viewed from the front, a vein 31 and an artery 32 run in parallel in the up-down direction at an interval behind the pancreas 30. The pancreas 30 is anatomically divided into a head portion on the left side of the vein 31, a body portion between the vein 31 and the artery 32, and a caudal portion on the right side of the artery 32. Therefore, in the present embodiment, the second region setting unit 23 divides the pancreas 30 into three small regions of the head portion 33, the body portion 34, and the caudal portion 35, with reference to the vein 31 and the artery 32. It should be noted that boundaries of the head portion 33, the body portion 34, and the caudal portion 35 are based on the boundary definition described in "General Rules for the Study of Pancreatic cancer 7th Edition, Revised and Enlarged Version, edited by Japan Pancreas Society, page 12, September, 2020". Specifically, a left edge of the vein 31 (a right edge of the vein 31 in a case in which the human body is viewed from the front) is defined as a boundary between the body portion 33 and the body portion 34, and a left edge of the artery 32 (a right edge of the artery 32 in a case in which the human body is viewed from the front) is defined as a boundary between the body portion 34 and the caudal portion 35.

For division, the second region setting unit 23 extracts the vein 31 and the artery 32 in the vicinity of the pancreas 30 in the target image G0. The second region setting unit 23 extracts a blood vessel region and a centerline (that is, the central axis) of the blood vessel region from the region near the pancreas 30 in the target image G0, for example, by the method described in JP2010-200925A and JP2010-220732A. In this method, first, positions of a plurality of candidate points constituting the centerline of the blood vessel and a principal axis direction are calculated based on values of voxel data constituting the target image G0. Alternatively, positional information of the plurality of candidate points constituting the centerline of the blood vessel and the principal axis direction are calculated by calculating the Hessian matrix for the target image G0 and analyzing eigenvalue of the calculated Hessian matrix. Then, a feature amount representing the blood vessel likeness is calculated for the voxel data around the candidate point, and it is determined whether or not the voxel data represents the blood vessel based on the calculated feature amount. Accordingly, the blood vessel region and the centerline thereof are extracted from the target image G0. The second region setting unit 23 divides the pancreas 30 into the head portion 33, the body portion 34, and the caudal portion 35, with reference to the left edge of the extracted vein 31 and artery 32 (a right edge in a case in which the human body is viewed from the front).

It should be noted that the division of the pancreas 30 into the head portion 33, the body portion 34, and the caudal portion 35 is not limited to the method described above. For example, the pancreas 30 may be divided into the head portion 33, the body portion 34, and the caudal portion 35 by using the segmentation model subjected to machine learning to extract the head portion 33, the body portion 34, and the caudal portion 35 from the pancreas 30. In this case, the segmentation model may be trained by preparing a plurality of pieces of teacher data consisting of pairs of a teacher image including the pancreas and a mask image obtained by dividing the pancreas into the head portion, the body portion, and the caudal portion based on the boundary definitions described above.

Figure 8:
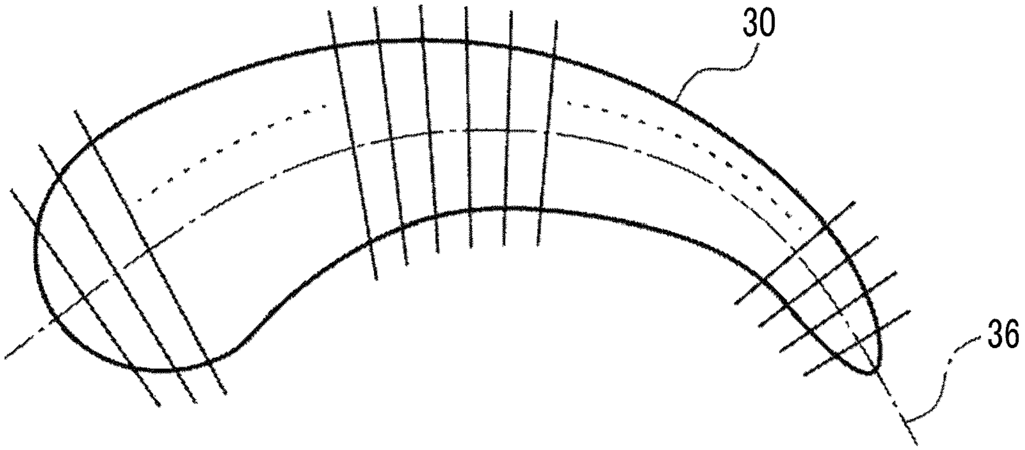
FIG. 8 is a diagram illustrating a setting of the small region.

In addition, the setting of the small region for the pancreas 30 is not limited to the division into the head portion 33, the body portion 34, and the caudal portion 35. FIG. 8 is a diagram illustrating another example of a small region setting. It should be noted that FIG. 8 is a diagram of the pancreas 30 as viewed from a head portion side of the human body. In the other example, the second region setting unit 23 extracts a central axis 36 extending in a longitudinal direction of the pancreas 30. As a method of extracting the central axis 36, the same method as the above-described method of extracting the centerlines of the vein 31 and the artery 32 can be used. Then, the second region setting unit 23 may set small regions in the pancreas 30 by dividing the pancreas 30 into a plurality of small regions at equal intervals along the central axis 36.

Figure 9:
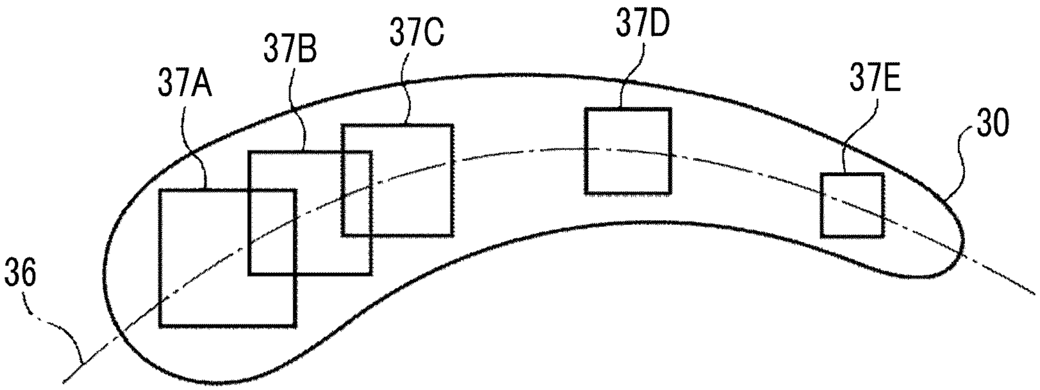
FIG. 9 is a diagram illustrating a setting of the small region.

Further, as illustrated in FIG. 9, small regions 37A to 37C that overlap each other may be set in the pancreas 30, or small regions spaced from each other, such as small regions 37D and 37E, may be set. In this case, the small region may be set along the central axis 36 of the pancreas 30 or may be set at any position.

Figure 10:
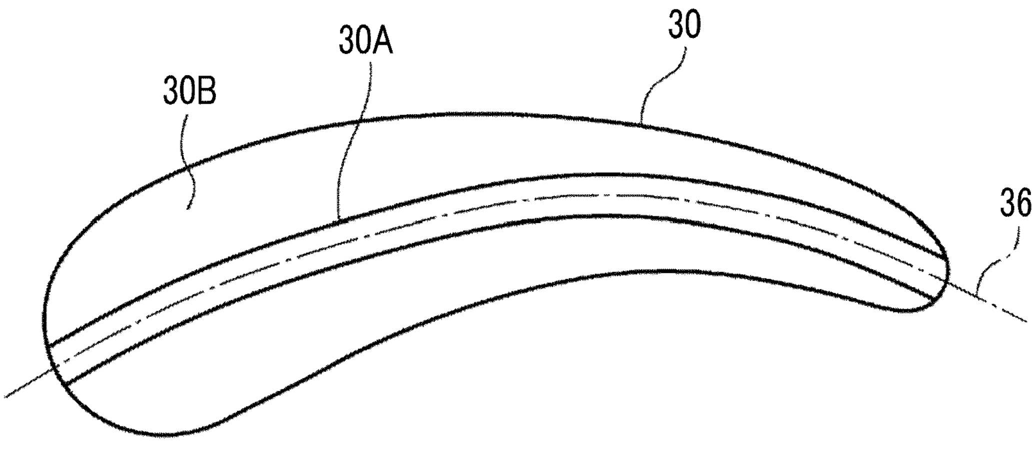
FIG. 10 is a diagram illustrating a setting of the small region.

In addition, as illustrated in FIG. 10, in the pancreas 30, a main pancreatic duct 30A is present along the central axis 36 of the pancreas 30. In the CT image, since the CT values are different between the main pancreatic duct 30A and the pancreas parenchyma 30B, the pancreas 30 can be divided into a region of the main pancreatic duct 30A and a region of the pancreas parenchyma 30B. Therefore, by dividing the pancreas 30 into the main pancreatic duct 30A and the pancreas parenchyma 30B, the main pancreatic duct 30A and the pancreas parenchyma 30B may be set as small regions, respectively.

In addition, small regions may be set by dividing only one of the main pancreatic duct 30A or the pancreas parenchyma 30B into the plurality of regions along the central axis 36 of the pancreas 30, and the second evaluation value may be derived for each small region.

Figure 11:
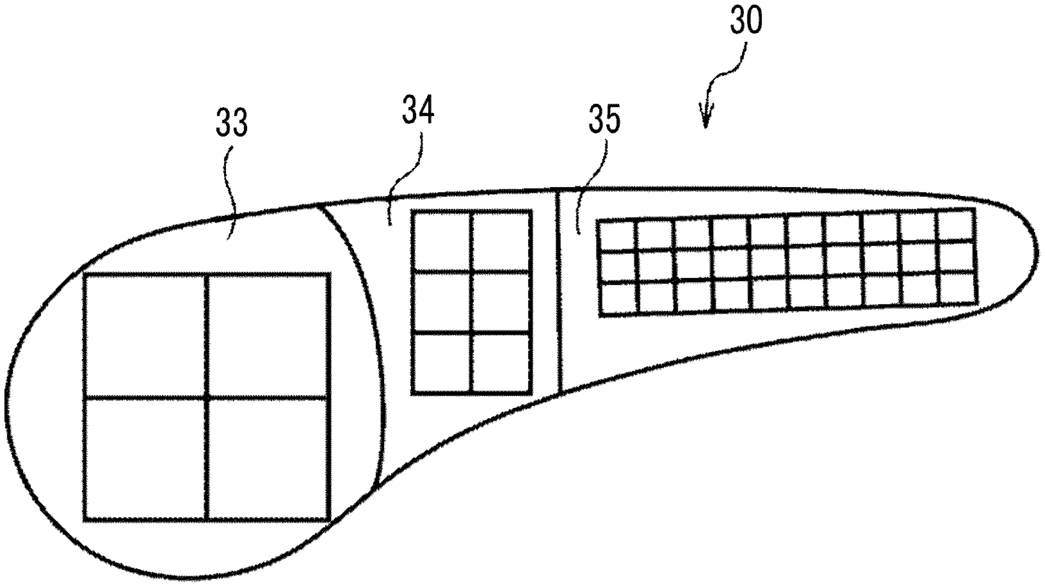
FIG. 11 is a diagram illustrating a setting of the small region.

In addition, as illustrated in FIG. 11, small regions may be further set in each of the head portion 33, the body portion 34, and the caudal portion 35 of the pancreas 30. In this case, the sizes of the small regions may be different in the head portion 33, the body portion 34, and the caudal portion 35. In FIG. 11, the sizes of the small regions set in the order of the head portion 33, the body portion 34, and the caudal portion 35 become smaller.

In addition, the second region setting unit 23 may set a plurality of small regions based on the indirect finding regarding the target organ. In this case, the second region setting unit 23 has a derivation model for deriving indirect finding information representing the indirect finding included in the target image G0 by analyzing the target image G0. The indirect finding is a finding that represents at least one feature of the shape or the property of the peripheral tissue of the tumor associated with the occurrence of the tumor in the pancreas. It should be noted that the "indirect" of the indirect finding is an expression in a sense that contrasts with a case in which the lesion, such as a tumor, is expressed as a "direct" finding that is directly connected to the disease, such as the cancer.

The indirect finding that represents features of the shape of the peripheral tissue of the tumor includes partial atrophy and swelling of the tissue of the pancreas and stenosis and dilation of the pancreatic duct. The indirect finding that represents features of the property of the peripheral tissue of the tumor includes fat replacement of the tissue (pancreas parenchyma) of the pancreas and calcification of the tissue of the pancreas.

The derivation model is the semantic segmentation model similar to the model for extracting the pancreas from the target image G0. The input image of the derivation model is the target image G0, the extraction object is a total of seven classes, which include each part of the pancreas showing atrophy, swelling, stenosis, dilation, fat replacement, and calcification of the above-described indirect findings, and the entire pancreas, and the output is an image in which the seven classes described above are labeled for each pixel of the target image G0.

Figure 12:
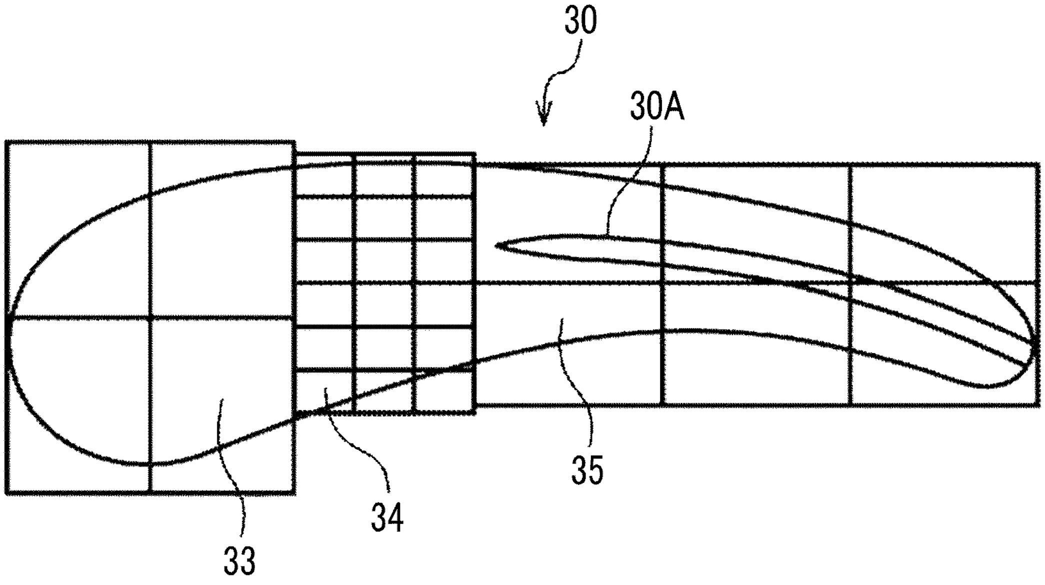
FIG. 12 is a diagram illustrating a setting of the small region.

In a case in which the indirect finding is present in the pancreas using the derivation model, the second region setting unit 23 sets a plurality of small regions in the pancreas based on the indirect finding. For example, as illustrated in FIG. 12, in a case in which the stenosis of the main pancreatic duct 30A is found in the vicinity of the boundary between the body portion 34 and the caudal portion 35 of the pancreas 30, small regions smaller in size than head portion 33 and the caudal portion 35 are set for the body portion 34 where the stenosis is assumed to be present.

It should be noted that the setting of the small region for the pancreas 30 illustrated in FIG. 6 to FIG. 12 may be performed in a case in which the first region A1 is the entire region of the target image G0 or the region in which the subject included in the target image G0 is present, or in a case in which the first region A1 is set to include the pancreas 30 and the periphery region of the pancreas 30 as illustrated in FIG. 4.

The first evaluation value derivation unit 24 derives a first evaluation value E1 that indicates the presence or absence of an abnormality in the first region A1 set in the target image G0 by the first region setting unit 22. To this end, the first evaluation value derivation unit 24 includes a derivation model 24A that derives the first evaluation value E1 from the first region A1. The derivation model 24A is constructed by a convolutional neural network similar to the model that extracts the pancreas from the target image G0 in the first region A1. The input image of the derivation model 24A is an image in the first region A1, and the first evaluation value E1, which is the output, is at least one of the presence probability of the abnormality, the positional information of the abnormality, the shape feature of the abnormality, or the property feature of the abnormality in the first region A1.

Figure 13:
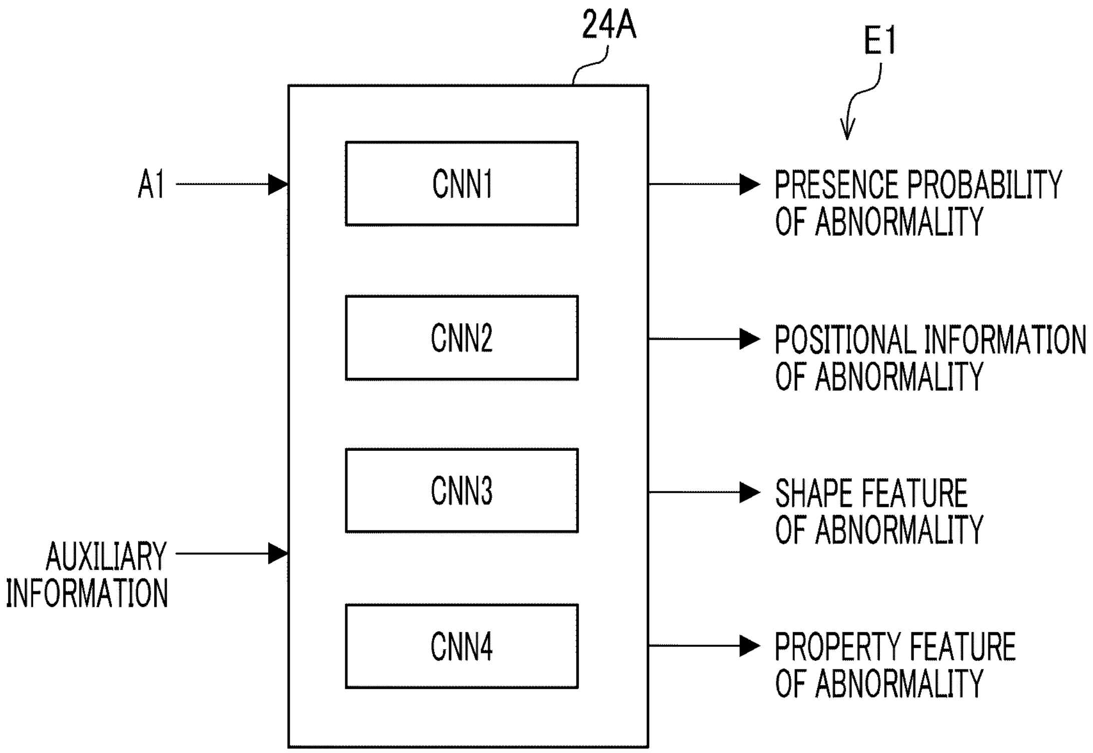
FIG. 13 is a diagram schematically illustrating a derivation model in a first evaluation value derivation unit.

FIG. 13 is a diagram schematically illustrating a derivation model in a first evaluation value derivation unit. As illustrated in FIG. 13, the derivation model 24A has convolutional neural networks (hereinafter, referred to as CNN) CNN1 to CNN4 according to the type of the first evaluation value E1 to be output. The CNN1 derives the presence probability of the abnormality. The CNN2 derives the positional information of the abnormality. The CNN3 derives the shape feature of the abnormality. The CNN4 derives the property feature of the abnormality. The presence probability of the abnormality is derived as a numerical value between 0 and 1. The positional information of the abnormality is derived as a mask for the abnormality in the first region A1 or a bounding box surrounding the abnormality. The shape feature of the abnormality may be a mask or a bounding box having a color according to the type of the shape of the abnormality, or may be a numerical value representing a probability for each type of the shape of the abnormality. Examples of the type of the shape feature include partial atrophy, swelling, stenosis, dilation, and roundness of a cross section of the tissue of the pancreas. It should be noted that a degree of unevenness of the shape or deformation of the organ can be known from the roundness. The property feature of the abnormality may be a mask or a bounding box having a color according to the type of the property of the abnormality, or may be a numerical value representing a probability for each type of the property of the abnormality. Examples of the type of the property feature include fat replacement and calcification of the tissue of the pancreas.

Although the first region A1 is input to the derivation model 24A, the organ region, the sub-region within the organ, and the region of the indirect finding in the first region A1 may be input to the derivation model 24A as auxiliary information. These pieces of auxiliary information are masks of the organ region, the sub-region in the organ, and the region of the indirect finding in the first region A1.

The organ region is a region of the target organ included in the first region A1 in a case in which the entire target image G0 or a region in which the subject is present is the first region A1 or in a case in which the region includes the pancreas and the periphery region of the pancreas as illustrated in FIG. 4. The sub-region in the organ is a region obtained by further finely classifying the region of the target organ included in the first region A1. For example, each region of the head portion, the body portion, and the caudal portion in a case in which the target organ is the pancreas corresponds to the sub-region in the organ. The region of the indirect finding is a region that exhibits the indirect finding. For example, in a case in which the caudal portion of the pancreas undergoes the atrophy, a region of the caudal portion is the region of the indirect finding.

Here, the atrophy, the swelling, the stenosis, and the dilation included in the shape feature derived by the CNN3 of the derivation model 24A may be captured as indirect findings in the target organ. On the other hand, the auxiliary information input to the derivation model 24A may include the indirect findings. In a case in which the indirect findings are input to the derivation model 24A as the auxiliary information, the derivation model 24A may be constructed so as not to derive the shape feature related to the indirect findings because the indirect findings are known.

In FIG. 13, the derivation model 24A is depicted as having four CNN1 to CNN4. Therefore, the input device 15 may be used to select which CNN to use in advance. It should be noted that the derivation model 24A is not limited to the derivation model having the four CNN1 to CNN4. It is sufficient that the derivation model 24A has at least one of the four CNN1 to CNN4. In a case in which the first region A1 is input, the derivation model 24A outputs the first evaluation value E1 corresponding to the selected CNN1 to CNN4.

The second evaluation value derivation unit 25 derives a second evaluation value E2 that indicates the presence or absence of the abnormality in each of the plurality of small regions set by the second region setting unit 23. To this end, the second evaluation value derivation unit 25 has a derivation model 25A that derives the second evaluation value E2 from the small regions. The derivation model 25A is constructed by a convolutional neural network similar to the derivation model 24A of the first evaluation value derivation unit 24. The derivation model 25A has the same schematic configuration as the derivation model 24A illustrated in FIG. 13 including the input of the auxiliary information, except that the input image is a small region. In a case in which the small region is input, the derivation model 25A outputs the second evaluation value E2 corresponding to the selected CNN1 to CNN4. The second evaluation value E2 is at least one of the presence probability of the abnormality, the positional information of the abnormality, the shape feature of the abnormality, or the property feature of the abnormality in each of the small regions.

It should be noted that the auxiliary information input to the derivation model 25A includes the organ region in the small region, the sub-region in the organ, the region of the indirect finding, and the like.

In addition, the small region for deriving the second evaluation value E2 is set to include the target organ in the first region. Therefore, the second evaluation value E2 indicates the presence or absence of a local abnormality of the target organ included in the target image G0 as compared with the first evaluation value E1. On the other hand, the first evaluation value E1 indicates the presence or absence of the global abnormality in the target image G0 as compared with the second evaluation value E2.

The third evaluation value derivation unit 26 derives a third evaluation value E3 that indicates the presence or absence of the abnormality in the target image G0 from the first evaluation value E1 and the second evaluation value E2. To this end, the third evaluation value derivation unit 26 includes a derivation model 26A that derives the third evaluation value E3 from the first evaluation value E1 and the second evaluation value E2. The derivation model 26A is constructed by a convolutional neural network similar to the derivation model 24A of the first evaluation value derivation unit 24. The inputs to the derivation model 26A are the first evaluation value E1 and the second evaluation value E2 for each of the plurality of small regions. The third evaluation value E3, which is output of the derivation model 26A, is at least one of the presence probability of the abnormality, the positional information of the abnormality, the shape feature of the abnormality, or the property feature of the abnormality in the target image G0. It should be noted that the presence or absence of the abnormality may be used as the third evaluation value E3, instead of the presence probability of the abnormality.

Figure 14:
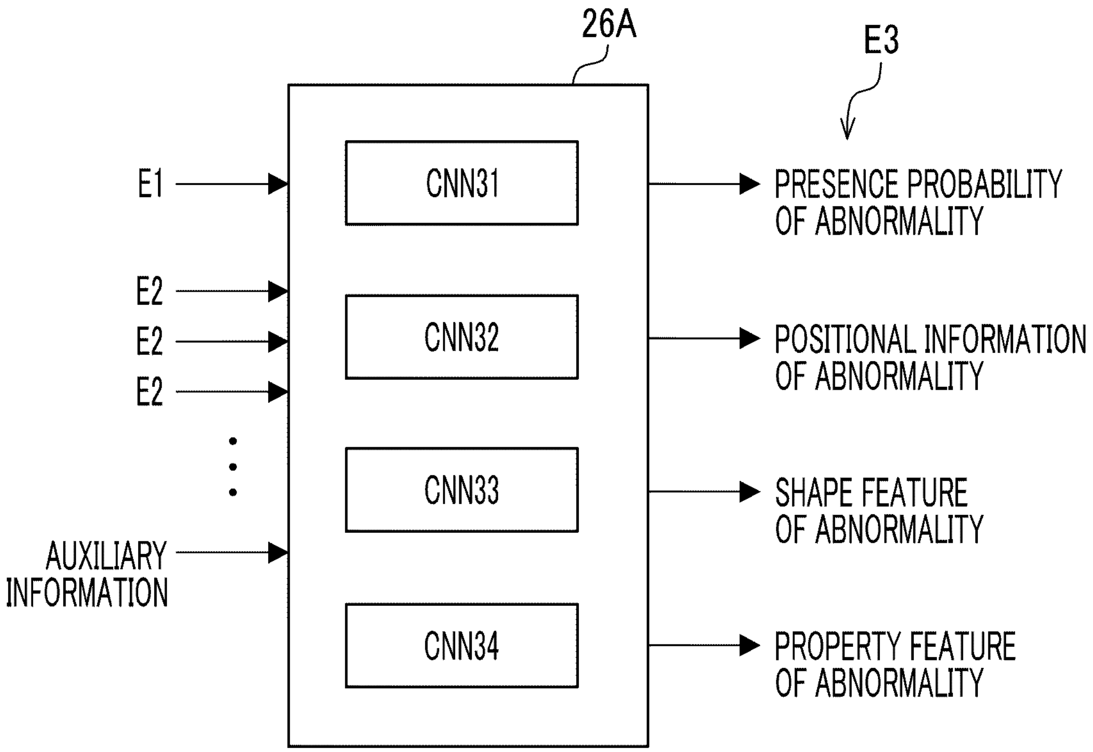
FIG. 14 is a diagram schematically illustrating a derivation model in a third evaluation value derivation unit.

FIG. 14 is a diagram schematically illustrating the derivation model in the third evaluation value derivation unit. As illustrated in FIG. 14, the derivation model 26A has the CNN31 to the CNN34 according to the type of the third evaluation value E3 to be output. Similar to CNN1 to CNN4 in the derivation model 24A illustrated in FIG. 13, CNN31 to CNN34 derive the presence probability of the abnormality, the positional information of the abnormality, the shape feature of the abnormality, and the property feature of the abnormality, respectively. It should be noted that the auxiliary information may be input to the derivation model 26A in the same manner as in the derivation model 24A. The auxiliary information input to the derivation model 26A includes the target image G0, the organ region in the target image G0, the sub-region in the organ, the region of the indirect finding, and the like.

Figure 15:
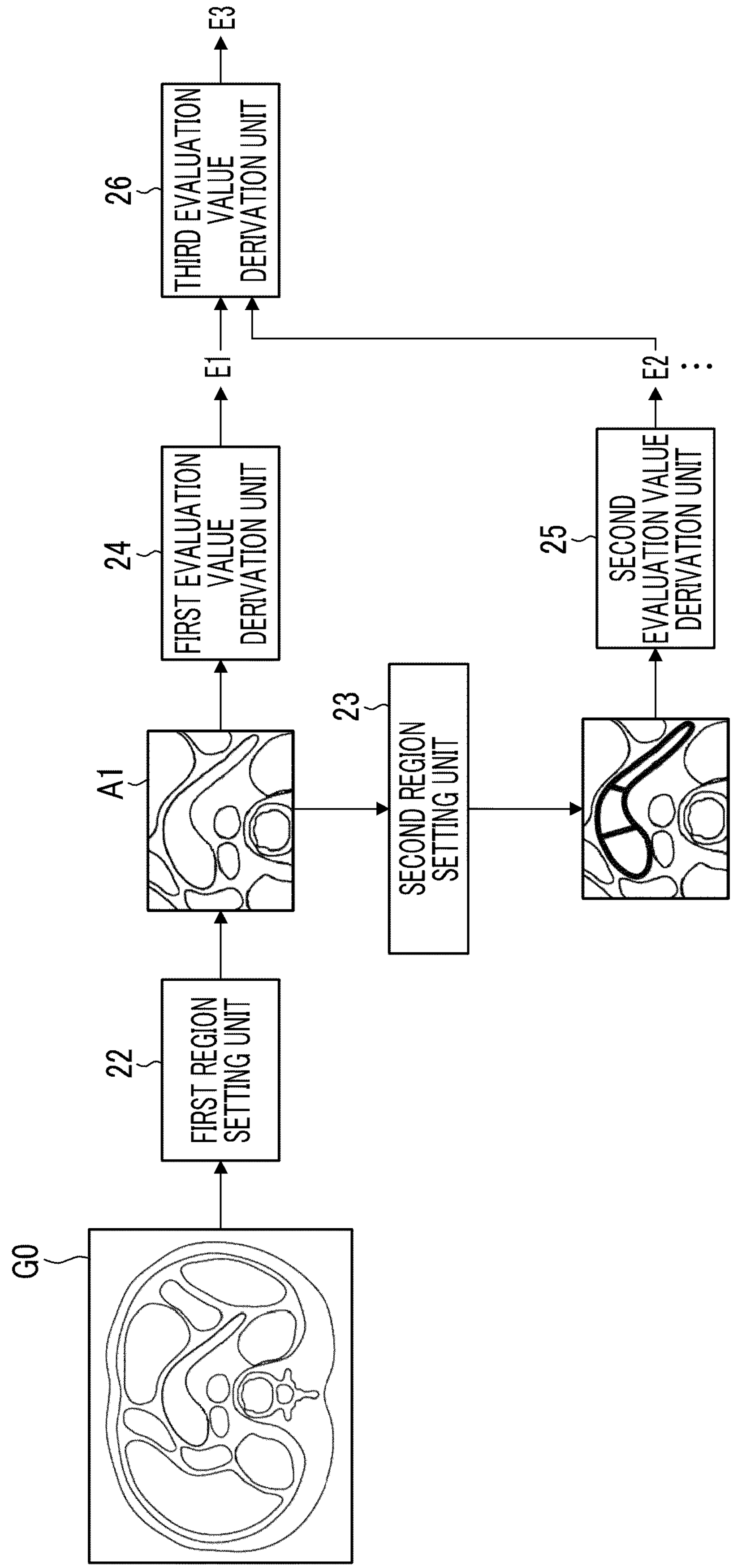
FIG. 15 is a diagram schematically illustrating a flow of processing performed in the present embodiment.

As described above, the flow of the processing performed by the first region setting unit 22, the second region setting unit 23, the first evaluation value derivation unit 24, the second evaluation value derivation unit 25, and the third evaluation value derivation unit 26 in the present embodiment is as illustrated in FIG. 15.

Figure 16:
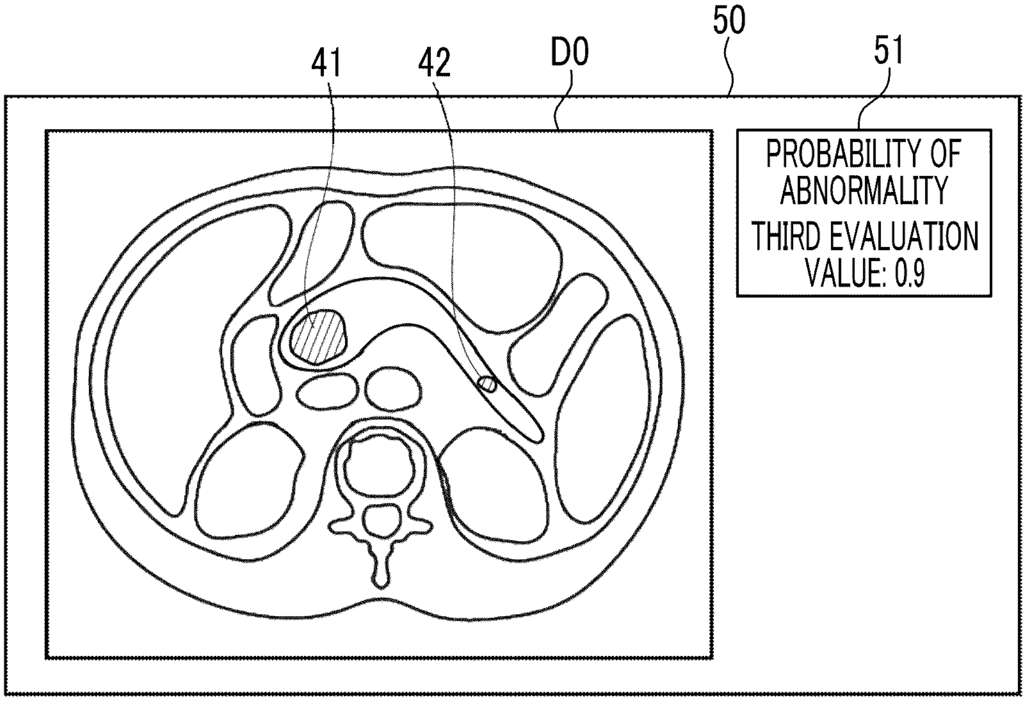
FIG. 16 is a diagram illustrating an evaluation result display screen.

The display control unit 27 displays the evaluation result based on at least one of the first evaluation value E1, the second evaluation value E2, or the third evaluation value E3, on the display 14. FIG. 16 is a diagram illustrating a display screen of the evaluation result. As illustrated in FIG. 16, one tomographic image D0 of the target images G0 and an evaluation result 51 are displayed on an evaluation result display screen 50. In FIG. 16, the evaluation result 51 is a probability of the abnormality included in the third evaluation value E3. In FIG. 16, 0.9 is displayed as the probability of the abnormality.

In addition, on the evaluation result display screen 50, the tomographic image D0 is displayed with a position of the abnormality distinguished from other regions based on the positional information of the abnormality included in the third evaluation value E3. In FIG. 16, a first abnormal region 41 is displayed in the head portion 33 of the pancreas 30, and a second abnormal region 42 is displayed in the caudal portion 35 of the pancreas 30 to be distinguished from other regions. Specifically, the first abnormal region 41 and the second abnormal region 42 are highlighted and displayed by applying colors to the first abnormal region 41 and the second abnormal region 42. It should be noted that, in FIG. 16, the fact that colors are given is illustrated by giving hatching. Here, the first abnormal region 41 is the region specified based on the first evaluation value E1. The second abnormal region 42 is the region specified based on the second evaluation value E2.

Figure 17:
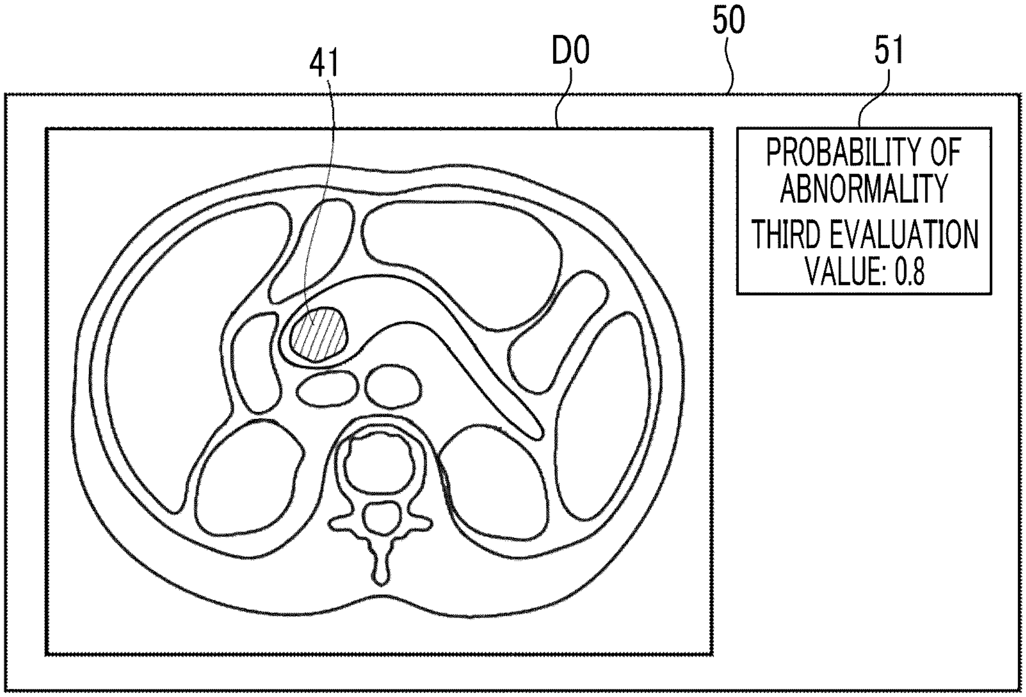
FIG. 17 is a diagram illustrating an evaluation result display screen.

In addition, in the present embodiment, the operator can switch and display the evaluation result based on the first evaluation value E1 and the evaluation result based on the second evaluation value E2 by operating the input device 15. FIG. 17 is a diagram illustrating a display screen of the evaluation result based on the first evaluation value E1. As illustrated in FIG. 17, in the evaluation result 51, 0.8, which is the probability of the abnormality which is the evaluation result based on the first evaluation value E1, is displayed. In addition, in the tomographic image D0, only the first abnormal region 41 is highlighted and displayed.

Figure 18:
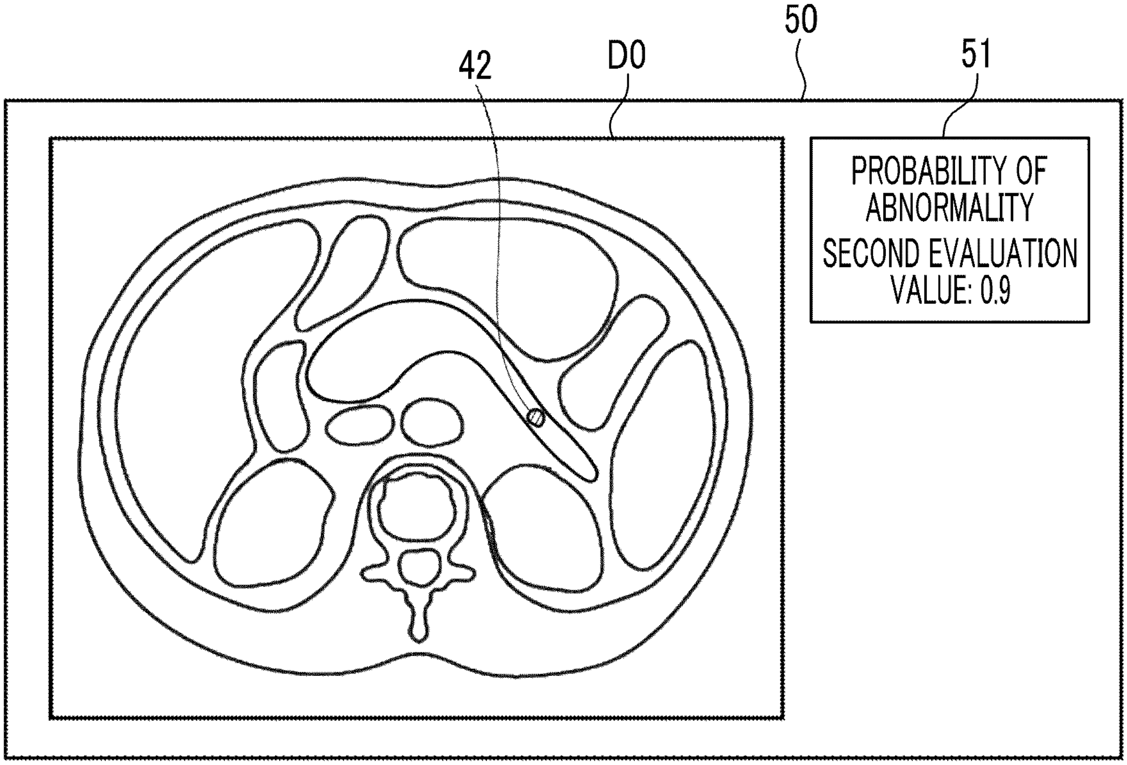
FIG. 18 is a diagram illustrating an evaluation result display screen.

FIG. 18 is a diagram illustrating a display screen of the evaluation result based on the second evaluation value E2. As illustrated in FIG. 18, in the evaluation result 51, 0.9, which is the probability of the abnormality which is the evaluation result based on the second evaluation value E2, is displayed. In addition, in the tomographic image D0, only the second abnormal region 42 is highlighted and displayed. It should be noted that the displayed second evaluation value E2 is a value derived for the small region from which the second abnormal region 42 is extracted.

Figure 19:
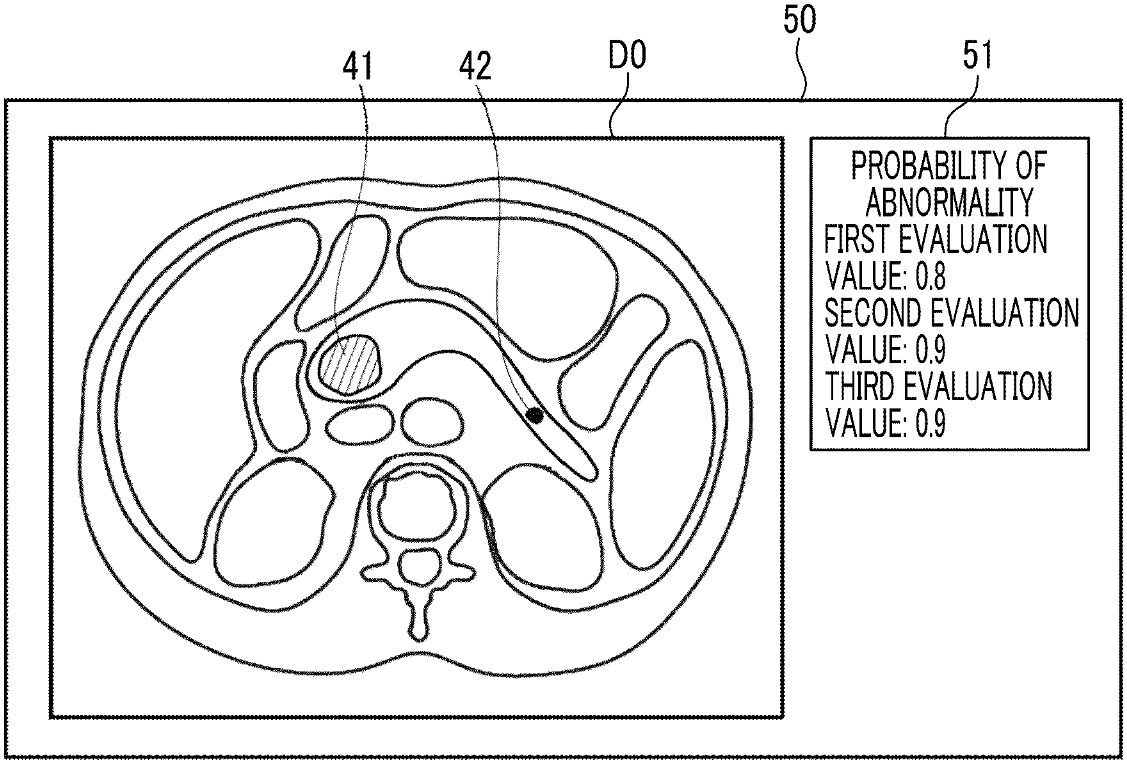
FIG. 19 is a diagram illustrating an evaluation result display screen.

On the other hand, as illustrated in FIG. 19, the first abnormal region 41 and the second abnormal region 42 may be highlighted and displayed in different colors in the tomographic image D0. In FIG. 19, the first abnormal region 41 is hatched and the second abnormal region 42 is filled in to indicate that the colors are different. In this case, all of the first evaluation value E1, the second evaluation value E2, and the third evaluation value E3 are displayed in the evaluation result 51. It should be noted that the displayed second evaluation value E2 is a value derived for the small region from which the second abnormal region 42 is extracted.

It should be noted that the highlighted display in the tomographic image D0 may be switched on or off in response to an instruction from the input device 15.

Figure 20:
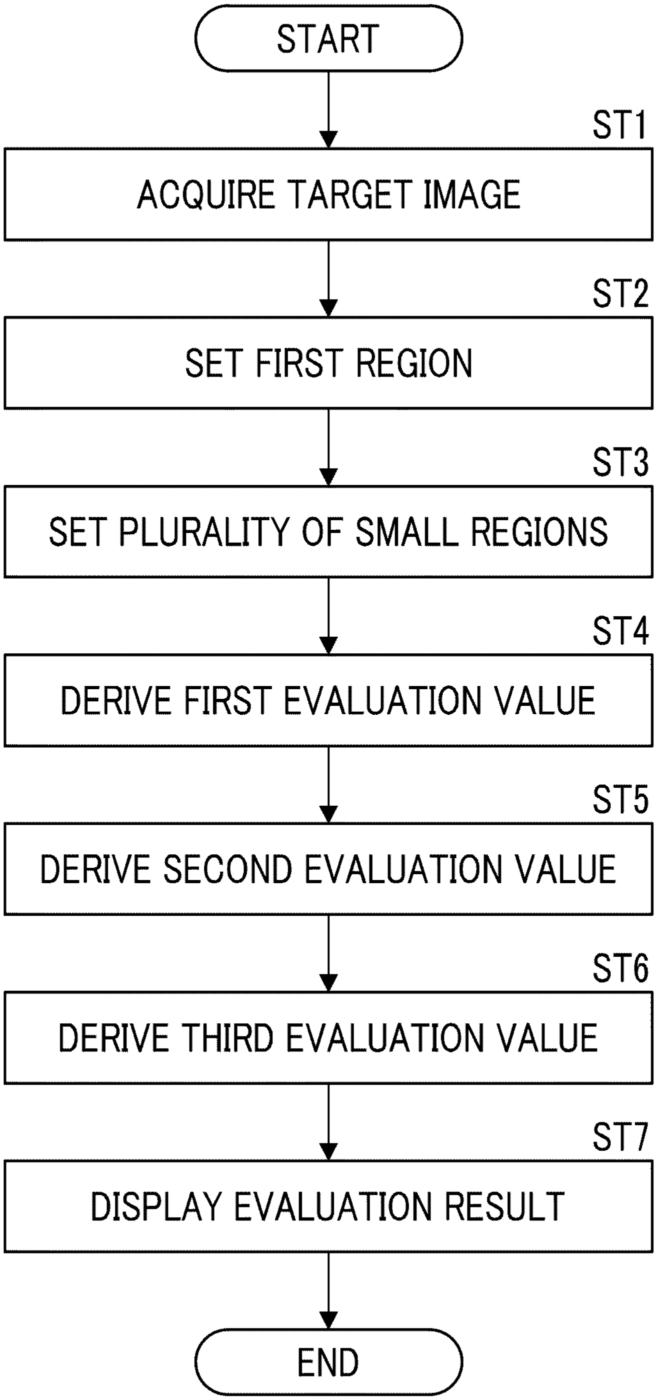
FIG. 20 is a flowchart illustrating processing performed in the present embodiment.

Hereinafter, processing performed in the present embodiment will be described. FIG. 20 is a flowchart illustrating the processing performed in the present embodiment. First, the image acquisition unit 21 acquires the target image G0 from the storage 13 (Step ST1), and the first region setting unit 22 sets the first region A1 including the entire target organ for the target image G0 (Step ST2).

Next, the second region setting unit 23 sets a plurality of small regions in the pancreas which is the target organ (Step ST3). Then, the first evaluation value derivation unit 24 derives the first evaluation value E1 that indicates the presence or absence of an abnormality in the first region (Step ST4). In addition, the second evaluation value derivation unit 25 derives the second evaluation value E2 that indicates the presence or absence of an abnormality in each of the plurality of small regions (Step ST5). Further, the third evaluation value derivation unit 26 derives the third evaluation value E3 that indicates the presence or absence of an abnormality in the target image G0 from the first evaluation value E1 and the second evaluation value E2 (Step ST6). Then, the display control unit 27 displays the evaluation result on the display 14 (Step ST7), and the processing ends.

As described above, in the present embodiment, the first evaluation value E1 indicating the presence or absence of the abnormality in the first region is derived, the second evaluation value E2 indicating the presence or absence of the abnormality in each of the plurality of small regions is derived, and the third evaluation value E3 indicating the presence or absence of the abnormality in the target image G0 from the first evaluation value E1 and the second evaluation value E2 is derived. Therefore, it is possible to evaluate both the abnormality that is present globally over the entire target organ and the abnormality that is present locally in the target organ without omission. As a result, it is possible to accurately evaluate the abnormality of the target organ.

In addition, by making the first to third evaluation values E1 to E3 at least one of the presence probability of the abnormality, the position of the abnormality, the shape feature of the abnormality, or the property feature of the abnormality for each of the target image G0, the first region A1, and the small region, it is possible to evaluate at least one of the presence probability of the abnormality, the position of the abnormality, the shape feature of the abnormality, or the property feature of the abnormality in the medical image.

In addition, it is possible to derive the second evaluation value E2 in an anatomical structural unit included in the first region by setting a plurality of small regions by dividing the first region based on the anatomical structure. Therefore, it is possible to evaluate the abnormality in an anatomical structural unit.

In addition, it is possible to derive the second evaluation value E2 for the small region that causes the indirect finding by setting the plurality of small regions based on the indirect finding for the target organ. Therefore, it is possible to evaluate the abnormality for the small region that causes the indirect finding.

It should be noted that, in the embodiment described above, the third evaluation value derivation unit 26 has the derivation model 26A including the CNN, but the present disclosure is not limited to this. In a case in which the first evaluation value E1 and the second evaluation value E2 are the presence probability of the abnormality, it is possible to derive the third evaluation value E3 based on a relationship between the first evaluation value E1 and the second evaluation value E2. For example, in a case in which the number of small regions where the first evaluation value E1 is larger than the first threshold value Th1 and the second evaluation value E2 larger than the second threshold value Th2 is obtained, is equal to or larger than the third threshold value, the third evaluation value E3 may indicate that the abnormality is present.

In addition, in the embodiment described above, the CNN is used as the SS model of the first region setting unit 22, the derivation model 24A of the first evaluation value derivation unit 24, and the derivation model 26A of the third evaluation value derivation unit 26, but the present disclosure is not limited to this. Models constructed by other machine learning methods other than the CNN can be used.

In addition, in the embodiment described above, the target organ is the pancreas, but the present disclosure is not limited to this. In addition to the pancreas, any organ, such as the brain, the heart, the lung, and the liver, can be used as the target organ.

In addition, in the embodiment described above, the CT image is used as the target image G0, but the present disclosure is not limited to this. In addition to the three-dimensional image, such as the MRI image, any image, such as a radiation image acquired by simple imaging, can be used as the target image G0.

In addition, in the embodiment described above, various processors shown below can be used as the hardware structure of the processing units that execute various types of processing, such as the image acquisition unit 21, the first region setting unit 22, the second region setting unit 23, the first evaluation value derivation unit 24, the second evaluation value derivation unit 25, the third evaluation value derivation unit 26, and the display control unit 27. As described above, the various processors include, in addition to the CPU that is a general-purpose processor which executes software (program) to function as various processing units, a programmable logic device (PLD) that is a processor of which a circuit configuration can be changed after manufacture, such as a field programmable gate array (FPGA), and a dedicated electrical circuit that is a processor having a circuit configuration which is designed for exclusive use to execute a specific processing, such as an application specific integrated circuit (ASIC).

One processing unit may be configured by one of these various processors or may be configured by a combination of two or more processors of the same type or different types (for example, a combination of a plurality of FPGAs or a combination of the CPU and the FPGA). In addition, a plurality of processing units may be formed of one processor.

As an example of configuring the plurality of processing units by one processor, first, as represented by a computer of a client, a server, and the like, there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

What is claimed is:

1. An image processing apparatus comprising:

at least one processor, wherein the processor is configured to:

set a first region including an entire target organ for a medical image, wherein the medical image is a tomographic image of an abdomen including a pancreas, and the target organ is a pancreas;

set a plurality of small regions including the target organ in the first region by dividing the pancreas into a head portion, a body portion, and a caudal portion;

input the first region to a first machine learning model and receive, as an output of the first machine learning model, a first evaluation value indicating presence or absence of an abnormality in the first region and comprising positional information of the abnormality in the first region;

input the plurality of small regions respectively into a second machine learning model and receive, as an output of the second machine learning model, a second evaluation value indicating the presence or absence of the abnormality in each of the plurality of small regions and comprising positional information of the abnormality in each of the plurality of small regions;

input the first evaluation value and the second evaluation value to a third machine learning model and receive, as an output of the third machine learning model, a third evaluation value indicating the presence or absence of the abnormality in the medical image from the first evaluation value and the second evaluation value and comprising positional information of the abnormality in the target organ; and display the medical image with a position of the abnormality distinguished from other regions based on the positional information of the abnormality included in the third evaluation value.

2. The image processing apparatus according to claim 1, wherein the first evaluation value includes at least one of a presence probability of the abnormality, a position of the abnormality, a shape feature of the abnormality, or a property feature of the abnormality in the first region, the second evaluation value includes at least one of a presence probability of the abnormality, a position of the abnormality, a shape feature of the abnormality, or a property feature of the abnormality in each of the small regions, and the third evaluation value includes at least one of a presence probability of the abnormality, a position of the abnormality, a shape feature of the abnormality, or a property feature of the abnormality in the medical image.

3. The image processing apparatus according to claim 1, wherein the processor is configured to set the plurality of small regions based on an indirect finding regarding the target organ.

4. The image processing apparatus according to claim 2, wherein the processor is configured to set the plurality of small regions based on an indirect finding regarding the target organ.

5. The image processing apparatus according to claim 3, wherein the indirect finding includes at least one of atrophy, swelling, stenosis, or dilation that occurs in the target organ.

6. The image processing apparatus according to claim 4, wherein the indirect finding includes at least one of atrophy, swelling, stenosis, or dilation that occurs in the target organ.

7. The image processing apparatus according to claim 1, wherein the processor is configured to:

set an axis passing through the target organ; and set the small region in the target organ along the axis.

8. The image processing apparatus according to claim 2, wherein the processor is configured to:

set an axis passing through the target organ; and set the small region in the target organ along the axis.

9. The image processing apparatus according to claim 1, wherein the processor is configured to display an evaluation result based on at least one of the first evaluation value, the second evaluation value, or the third evaluation value on a display.

10. An image processing method comprising:

setting a first region including an entire target organ for a medical image, wherein the medical image is a tomographic image of an abdomen including a pancreas, and the target organ is a pancreas;

setting a plurality of small regions including the target organ in the first region by dividing the pancreas into a head portion, a body portion, and a caudal portion;

inputting the first region to a first machine learning model and receiving, as an output of the first machine learning model, a first evaluation value indicating presence or absence of an abnormality in the first region and comprising positional information of the abnormality in the first region;

inputting the plurality of small regions respectively into a second machine learning model and receiving, as an output of the second machine learning model, a second evaluation value indicating the presence or absence of the abnormality in each of the plurality of small regions and comprising positional information of the abnormality in each of the plurality of small regions;

inputting the first evaluation value and the second evaluation value to a third machine learning model and receiving, as an output of the third machine learning model, a third evaluation value indicating the presence or absence of the abnormality in the medical image from the first evaluation value and the second evaluation value and comprising positional information of the abnormality in the target organ; and displaying the medical image with a position of the abnormality distinguished from other regions based on the positional information of the abnormality included in the third evaluation value.

11. A non-transitory computer-readable storage medium that stores an image processing program causing a computer to execute:

a procedure of setting a first region including an entire target organ for a medical image, wherein the medical image is a tomographic image of an abdomen including a pancreas, and the target organ is a pancreas;

a procedure of setting a plurality of small regions including the target organ in the first region by dividing the pancreas into a head portion, a body portion, and a caudal portion;

a procedure of inputting the first region to a first machine learning model and receiving, as an output of the first machine learning model, a first evaluation value indicating presence or absence of an abnormality in the first region and comprising positional information of the abnormality in the first region;

a procedure of inputting the plurality of small regions respectively into a second machine learning model and receiving, as an output of the second machine learning model, a second evaluation value indicating the presence or absence of the abnormality in each of the plurality of small regions and comprising positional information of the abnormality in each of the plurality of small regions;

a procedure of inputting the first evaluation value and the second evaluation value to a third machine learning model and receiving, as an output of the third machine learning model, a third evaluation value indicating the presence or absence of the abnormality in the medical image from the first evaluation value and the second evaluation value and comprising positional information of the abnormality in the target organ; and a procedure of displaying the medical image with a position of the abnormality distinguished from other regions based on the positional information of the abnormality included in the third evaluation value.

* * * * *